United States Patent
Hsu

(10) Patent No.: US 9,081,191 B2
(45) Date of Patent: Jul. 14, 2015

(54) COMPACT PROJECTOR WITH HIGH OPTICAL PERFORMANCE

(71) Applicants: Sintai Optical (Shenzhen) Co., Ltd., Shenzhen City, Guandong Province (CN); Asia Optical International Ltd., Tortola (GB)

(72) Inventor: Chia-Chien Hsu, Taichung (TW)

(73) Assignees: SINTAI OPTICAL (SHENZHEN) CO., LTD., Shenzhen, Guandong Province (CN); ASIA OPTICAL INTERNATIONAL LTD., Tortola (VG)

( * ) Notice: Subject to any disclaimer, the term of this patent is extended or adjusted under 35 U.S.C. 154(b) by 155 days.

(21) Appl. No.: 13/917,741

(22) Filed: Jun. 14, 2013

(65) Prior Publication Data

US 2014/0036234 A1    Feb. 6, 2014

(51) Int. Cl.
| | |
|---|---|
| *G03B 21/14* | (2006.01) |
| *G02B 27/09* | (2006.01) |
| *G03B 21/20* | (2006.01) |
| *G03B 33/12* | (2006.01) |
| *H04N 9/31* | (2006.01) |

(52) U.S. Cl.
CPC ............ *G02B 27/0961* (2013.01); *G03B 21/20* (2013.01); *G03B 21/2013* (2013.01); *G03B 21/2033* (2013.01); *G03B 21/2066* (2013.01); *G03B 21/2073* (2013.01); *G03B 33/12* (2013.01); *H04N 9/3197* (2013.01)

(58) Field of Classification Search
CPC . H04N 9/3161; H04N 9/3197; G02B 27/102; G02B 27/0961

USPC ............... 353/30, 31, 37, 38, 94, 98, 99, 101; 359/570, 619, 676, 680, 707, 713, 740, 359/834; 349/5, 7–9

See application file for complete search history.

(56) References Cited

U.S. PATENT DOCUMENTS

| | | | | |
|---|---|---|---|---|
| 3,988,066 | A * | 10/1976 | Suzuki et al. | 355/78 |
| 8,197,066 | B2 * | 6/2012 | Nagashima et al. | 353/20 |
| 2001/0048560 | A1 * | 12/2001 | Sugano | 359/618 |
| 2002/0113911 | A1 * | 8/2002 | Fukuda | 349/5 |

(Continued)

FOREIGN PATENT DOCUMENTS

| | | |
|---|---|---|
| CN | 101855902 | 10/2010 |
| TW | M385719 | 8/2010 |

OTHER PUBLICATIONS

English Abstract translation of TWM385719 (Published Aug. 1, 2010).

(Continued)

*Primary Examiner* — Sultan Chowdhury
(74) *Attorney, Agent, or Firm* — McClure, Qualey & Rodack, LLP

(57) ABSTRACT

A projector includes an illuminating system and an imaging system. The illuminating system includes a light source module, a lens array, a condenser lens and a display panel, in which light beams are generated by the light source module, uniformly dispersed by the lens array, condensed by the condenser lens, and reflected by the display panel to obtain image light, and the condenser lens has an effective focal length substantially equal to a product of an f-number of the illuminating system and a thickness of the lens array. The imaging system outwardly projects the image light.

10 Claims, 2 Drawing Sheets

(56) References Cited

U.S. PATENT DOCUMENTS

| | | | |
|---|---|---|---|
| 2003/0039036 A1* | 2/2003 | Kruschwitz et al. | 359/707 |
| 2005/0179871 A1* | 8/2005 | Kobayashi et al. | 353/31 |
| 2011/0234985 A1* | 9/2011 | Ryf et al. | 353/38 |

OTHER PUBLICATIONS

English Abstract translation of CN101855902 (Published Oct. 6, 2010).

* cited by examiner

COMPACT PROJECTOR WITH HIGH OPTICAL PERFORMANCE

BACKGROUND OF THE INVENTION

1. Field of the Invention

The invention relates to a projector with small volume and optimum optical performance.

2. Description of the Related Art

Electronic devices (e.g., mobile phones, cameras and notebook computers, etc.) with a pico projector contained are already seen in the present market. To be installed in the electronic products, the projector is necessarily limited in volume. The smaller of the volume of the projector, the more electronic devices can be collocated therewith. However, the minimized-volume projectors usually have poor optical performance. Therefore, it is a significant issue that how to keep the optical performance of a projector as the volume thereof is reduced.

BRIEF SUMMARY OF THE INVENTION

In view of this, the invention provides a projector capable of keeping the optical performance as the volume thereof is reduced by means of adjusting an effective focus length of a condenser lens and a thickness of a lens array.

A projector in accordance with an exemplary embodiment of the invention includes an illuminating system and an imaging system. The illuminating system includes a light source module, a lens array, a condenser lens and a display panel, in which light beams are generated by the light source module, uniformly dispersed by the lens array, condensed by the condenser lens, and reflected by the display panel to obtain image light, and the condenser lens has an effective focal length substantially equal to a product of an f-number of the illuminating system and a thickness of the lens array. The imaging system outwardly projects the image light.

In another exemplary embodiment, the effective focal length of the condenser lens is ranged between 8.25 mm and 19.2 mm.

In yet another exemplary embodiment, the light source module includes a first light source and a second light source.

In another exemplary embodiment, the first light source includes a green light-emitting diode, and the second light source includes a red light-emitting diode and a blue light-emitting diode.

In yet another exemplary embodiment, the projector further including a plurality of collimating lenses configured to convert the light beams generated by the first light source and the second light source into collimated beams.

In another exemplary embodiment, the projector further including a light source synthesizer, in which the collimated beams are combined by the light source synthesizer and projected to the lens array.

In yet another exemplary embodiment, the light source synthesizer is disposed at an intersection of the collimated beams.

In another exemplary embodiment, the lens array includes 3×5 spherical or aspherical micro biconvex lenses.

In yet another exemplary embodiment, the projector further including a reflecting mirror configured to reflect the light beams passing through the lens array to the condenser lens.

In another exemplary embodiment, the projector further including a polarization beam splitter configured to receive the light beams passing through the condenser lens, separate polarized light in a particular direction from the light beams passing through the condenser lens, and project the polarized light to the display panel.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Figure 1:
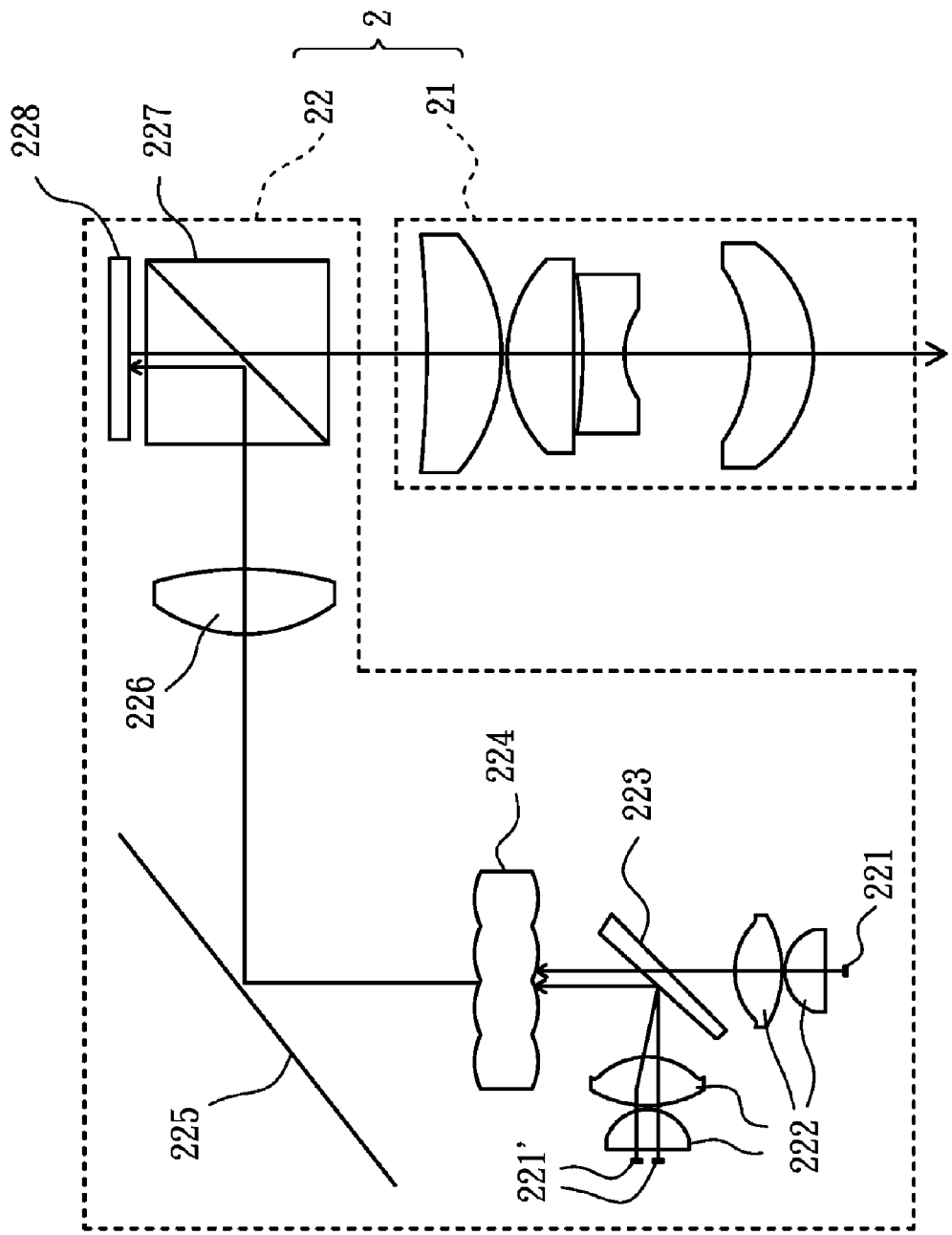
FIG. 1 is a schematic view of a projector of the invention.

Referring to FIG. 1, a schematic view of a projector 2 of the invention is shown. The projector 2 includes an imaging system 21 and an illuminating system 22. The structure of the imaging system 21 and the illuminating system 22 are described below.

The illuminating system 22 includes a light source module 221, 221', a plurality of collimating lenses 222, a light source synthesizer 223, a lens array 224, a reflecting mirror 225, a condenser lens 226, a polarization beam splitter 227 and a display panel 228. The light source module, including a first light source 221 (e.g., a green light-emitting diode) and a second light source 221' (e.g., a red light-emitting diode and a blue light-emitting diode), is utilized to generate divergent light beams of different colors, in which the divergent light beams are converted into collimated beams when passing through the collimating lenses 222, and the light source synthesizer is disposed at a intersection of the collimated beams, so that the collimated beams combined by the light source synthesizer 223 are emitted toward the lens array 224. The lens array 224 includes at least 3×5 spherical or aspherical micro biconvex lenses. The light beams generated by the light source module are uniformly dispersed by the lens array 224, reflected to the condenser lens 226 by the reflecting mirror 225 for convergence, and emitted to the polarization beam splitter 227 for separating polarized light in a particular direction therefrom. The polarized light is projected to the display panel 228 which adds image information into the polarized light to obtain image light. Then, the image light enters the imaging system 21.

The imaging system 21 includes a plurality of lenses, through which the image light generated by the illuminating system 22 passes and is projected to a screen (not shown in Figs.).

An f-number (F/#) of the imaging system 21 is required to match an f-number (F/#) of the illuminating system 22, so that the image light generated by the illuminating system 22 can be fully utilized by the imaging system 21.

An F/# (or named f-number) of an optical system can be expressed by the following equation:

$$F/\# = EFL/D \qquad (1)$$

wherein EFL represents an effective focus length, and D represents a diameter of clear aperture.

Figure 2:
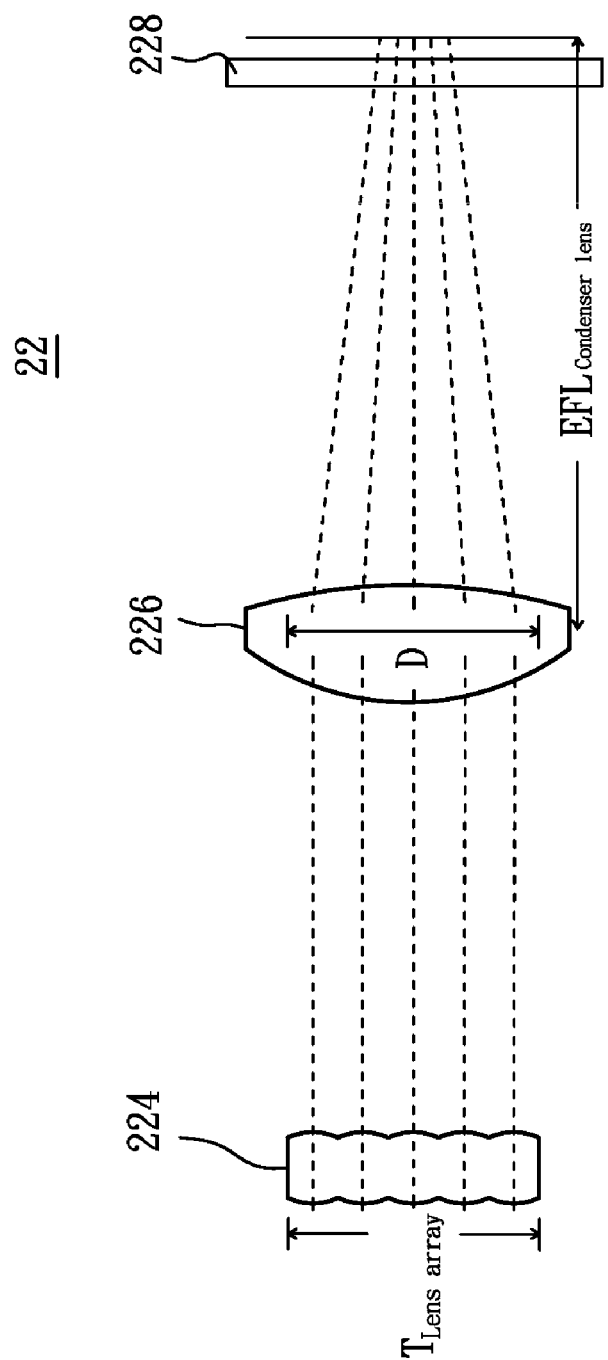
FIG. 2 shows a design principle of a projector of the invention.

Referring to FIG. 2, a design principle of a projector of the invention is illustrated. In the illuminating system 22, the light beams passing through the lens array 224 and the condenser lens 226 are projected to the display panel 228. It can be seen from FIG. 2 that the diameter of clear aperture D is equal to the thickness of the lens array 224. Accordingly, the above-described equation (1) can be rewritten as:

$$F/\#_{Illuminating\ system} = EFL_{Condenser\ lens}/T_{Lens\ array}$$

or $$EFL_{Condenser\ lens} = F/\#_{Illuminating\ system} \times T_{Lens\ array} \quad (2)$$

wherein $EFL_{Condenser\ lens}$ represents an effective focus length of the condenser lens 226, $F/\#_{Illuminating\ system}$ represents an f-number of the illuminating system 22, and $T_{Lens\ array}$ represents a thickness of the lens array 224.

Thus, if the $F/\#_{Illuminating\ system}$ of the illuminating system 22 and the $T_{Lens\ array}$ of the lens array 224 are known, then the $EFL_{Condenser\ lens}$ of the condenser lens 226 can be calculated by the equation (2). For example, the $F/\#_{Illuminating\ system}$ of the illuminating system 22 is practically ranged between 1.5 and 2.4, and the $T_{Lens\ array}$ of the lens array 224 is practically ranged between 5.5 mm and 8 mm. Accordingly, the $EFL_{Condenser\ lens}$ of the condenser lens 226 is necessarily limited in the range between 8.25 mm and 19.2 mm.

In accordance with the calculated $EFL_{Condenser\ lens}$ of the condenser lens 226, a pico projector can be designed with optimum optical performance and a minimized volume.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A projector, comprising:
    an illuminating system comprising a light source module, a lens array, a condenser lens and a display panel, in which light beams are generated by the light source module, uniformly dispersed by the lens array, condensed by the condenser lens, and reflected by the display panel to obtain image light, and the condenser lens has an effective focal length substantially equal to a product of an f-number of the illuminating system and a thickness of the lens array; and
    an imaging system outwardly projecting the image light.

2. The projector as claimed in claim 1, wherein the effective focal length of the condenser lens is ranged between 8.25 mm and 19.2 mm.

3. The projector as claimed in claim 1, wherein the light source module comprises a first light source and a second light source.

4. The projector as claimed in claim 3, wherein the first light source comprises a green light-emitting diode, and the second light source comprises a red light-emitting diode and a blue light-emitting diode.

5. The projector as claimed in claim 3 further comprising a plurality of collimating lenses configured to convert the light beams generated by the first light source and the second light source into collimated beams.

6. The projector as claimed in claim 5 further comprising a light source synthesizer, in which the collimated beams are combined by the light source synthesizer and projected to the lens array.

7. The projector as claimed in claim 6, wherein the light source synthesizer is disposed at an intersection of the collimated beams.

8. The projector as claimed in claim 1, wherein the lens array comprises 3×5 spherical or aspherical micro biconvex lenses.

9. The projector as claimed in claim 1 further comprising a reflecting mirror configured to reflect the light beams passing through the lens array to the condenser lens.

10. The projector as claimed in claim 1 further comprising a polarization beam splitter configured to receive the light beams passing through the condenser lens, separate polarized light in a particular direction from the light beams passing through the condenser lens, and project the polarized light to the display panel.

* * * * *